(12) United States Patent
Richman et al.

(10) Patent No.: US 6,625,582 B2
(45) Date of Patent: Sep. 23, 2003

(54) METHOD AND SYSTEM FOR CONVERTING A DESIGNATED PORTION OF FUTURE SOCIAL SECURITY AND OTHER RETIREMENT PAYMENTS TO CURRENT BENEFITS

(75) Inventors: Richard Paul Richman, Greenwich, CT (US); Craig Singer, Bedford Corners, NY (US)

(73) Assignee: Richman/Singer Venture, Greenwich, CT (US)

( * ) Notice: Subject to any disclaimer, the term of this patent is extended or adjusted under 35 U.S.C. 154(b) by 0 days.

(21) Appl. No.: 09/267,255

(22) Filed: Mar. 12, 1999

(65) Prior Publication Data

US 2002/0161681 A1 Oct. 31, 2002

(51) Int. Cl.$^7$ ............................................. G06F 17/60
(52) U.S. Cl. ........................................ 705/35; 705/39
(58) Field of Search ........................................... 705/35

(56) References Cited

U.S. PATENT DOCUMENTS

| | | | |
|---|---|---|---|
| 4,750,121 A | | 6/1988 | Halley et al. |
| 4,969,094 A | | 11/1990 | Halley et al. |
| 5,083,270 A | * | 1/1992 | Gross et al. ................... 705/35 |

(List continued on next page.)

FOREIGN PATENT DOCUMENTS

| | | | | |
|---|---|---|---|---|
| GB | WO 00/49543 | * | 8/2000 | ........... G06F/17/60 |

OTHER PUBLICATIONS

Mirer, Thad W. Th Optimal time to File for Social Securit Benefits, Public Finance Review v26n6, Nov. 1998, pp. 611–636.*

Reimers, C. Honig, M. Responses to Social Security by Men and Women: Myopic and Far–Sighted, Journal of Human Resources, v31n2, Spring 1996, p. 359(24).*

J. Downs and J. E. Goodman, Dictionary of Fiannce and Investment Terms, Fifth Edition, Barron's Educational Series, p. 136.*

Social Security Bulletin, vol. 59, No. 2, Summer 1996, pp. 67–70.*

Primary Examiner—V. Millin
Assistant Examiner—Charles R. Kyle
(74) Attorney, Agent, or Firm—Kramer Levin Naftalis & Frankel LLP

(57) ABSTRACT

A system and method for a beneficiary of Social Security payments or other retirement payments to access present value of future benefits to meet current financial and other objectives is provided. A financial institution is designated to be a direct depository and a disbursement agent for disbursing, at the direction of the beneficiary predetermined portions of retirement payments to a funding source or asset or service provider in exchange for access to capital or the acquisition of an asset or service by the beneficiary in an amount or having a value at least in part based on present value of a designated portion of future retirement payments. In the event of the premature termination of the beneficiary's participation in the program, the funding source or asset or service provider may seek reimbursement of a specified amount relating to the capital or asset or service it made available to the beneficiary, but not from subsequent retirement payments. In the event that the beneficiary dies during the term of the program, the funding source or asset or service provider are precluded from looking to a surviving spouse's share of remaining retirement payments, or from the beneficiary's estate, for reimbursement of any sustained loss, nor can it have any remaining interest in any asset acquired or service obtained by the beneficiary under the program. The funding source or asset or service provider can insure against the risk by purchasing group term life insurance in its favor covering all beneficiaries participating in the program.

34 Claims, 3 Drawing Sheets

U.S. PATENT DOCUMENTS

| | | |
|---|---|---|
| 5,193,057 A | 3/1993 | Longfield |
| 5,206,803 A * | 4/1993 | Vitigliano et al. ............ 705/39 |
| 5,631,828 A | 5/1997 | Hagan |
| 5,724,523 A | 3/1998 | Longfield |
| 5,745,885 A | 4/1998 | Mottola et al. |
| 5,754,980 A | 5/1998 | Anderson et al. |
| 5,787,404 A | 7/1998 | Fernandez-Holmann |
| 5,809,484 A | 9/1998 | Mottola et al. |
| 5,933,815 A * | 8/1999 | Golden ........................ 705/35 |

* cited by examiner

METHOD AND SYSTEM FOR CONVERTING A DESIGNATED PORTION OF FUTURE SOCIAL SECURITY AND OTHER RETIREMENT PAYMENTS TO CURRENT BENEFITS

BACKGROUND OF THE INVENTION

The present invention relates generally to a system and method which provide a mechanism for a recipient of Social Security payments, or of other retirement payments, to access present value of a designated portion of its future retirement benefits. More particularly, the inventive system and method enable a beneficiary of Social Security or other retirement benefits to obtain capital from a funding source, acquire an asset directly from an asset provider, or obtain a service from a service provider, in exchange for the regular and convenient payment to the funding source, asset provider, or service provider of a predetermined portion of the beneficiary's retirement benefits, without encumbering the beneficiary's rights to its future retirement benefits.

The fast growing ranks of retirement age individuals are, for various reasons, finding Social Security benefits or other retirement benefits, or the anticipated timing of receipts therefrom, to be somewhat inadequate to meet their present and future financial needs, expectations, and objectives, given the many opportunities, financial and otherwise, currently available in today's dynamic environment. These seniors are increasingly coming to realize that perhaps, if given access to sufficient current resources, they could do more to advance their personal well-being than can the monolithic retirement plans created to cover large groups of individuals.

However, considering the current legislated proscriptions in the United States against assigning or otherwise alienating future retirement benefits (e.g., as set forth in the Social Security Act, the Employee Retirement Income Security Act of 1974, as amended ("ERISA"), and the United States tax laws), Social Security benefits or other retirement benefits have not generally been seen as an adequate source of current capital, particularly to support financing based upon future receipts. Thus, a need exists for a financial program that allows a beneficiary of Social Security benefits or other retirement benefits to access, in a convenient manner, present value of future retirement benefits to meet current financial objectives while complying with the United States laws and regulations governing the assignment of future Social Security or other retirement benefits.

SUMMARY OF THE INVENTION

Generally speaking, a financial program in accordance with the present invention provides a system and method for enabling recipients of Social Security payments, or of other retirement payments, to convert a designated portion of future payments into current available financial resources that may be applied, for example, to acquire an asset, such as an investment in mutual funds, or obtain a service, such as provided in a supplemental health insurance policy.

To participate in the inventive financial program, each recipient or "beneficiary" of retirement payments agrees to the designation of a specified financial institution to serve as (1) the direct depository of the beneficiary's retirement payments, and (2) the disbursement agent of a predetermined portion of such payments from the beneficiary's individual deposit account over the designated term of the program. In exchange for an advance of capital from a funding source, or in exchange for an asset acquired or a service obtained directly from an asset or service provider, in an amount or having a value at least in part based on present value of a designated portion of the beneficiary's future retirement payments, the beneficiary is required to direct the deposit account to disburse to the funding source or asset or service provider a portion of the beneficiary's retirement payments (as they are received over the program term) predetermined to satisfy the terms of the advance.

Should the beneficiary opt to revoke its participation in the financial program, or should the beneficiary's participation in the program otherwise terminate before the end of the designated program term, the funding source or asset or service provider would no longer receive any payments from the beneficiary's deposit account. However, the beneficiary may be obligated to reimburse the funding source or asset or service provider in a specified amount relating to the capital, assets, or services advanced, using resources other than future retirement benefits (e.g., using funds obtained from the liquidation of an acquired asset).

Should the beneficiary die during the term of the program, the funding source or asset or service provider would not be able to seek reimbursement from a surviving spouse's share of remaining retirement payments, or from the beneficiary's estate. In the preferred embodiment of the present invention, the funding source or asset or service provider would, however, insure against this risk by purchasing group term life insurance for its benefit covering all beneficiaries participating in the program.

The system according to the present invention utilizes known computer capabilities and electronic communications links to effect the automated implementation of various aspects of the inventive financial program, for example, to carry out the electronic transfer of funds into and out of the individual deposit account of a program participant.

It is accordingly an object of the present invention to provide a system and method which offer a mechanism for beneficiaries of Social Security benefits, or of other retirement benefits, to access present value of a designated portion of their future retirement benefits to meet current objectives such as, for example, acquiring assets, funding investments, restructuring debt, estate planning, or purchasing a service such as supplemental health insurance or prepaid funeral expenses.

It is a further object of the present invention to provide a system and method which link various providers of capital and other assets or services to Social Security beneficiaries or other recipients of retirement benefits.

It is also an object of the present invention to provide a system and method that complies with current United States laws and regulations regarding the assignment or alienation of future Social Security payments or other retirement payments.

The invention accordingly comprises the several steps and the relation of one or more of such steps with respect to each of the others, and the system embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a filler understanding of the invention, reference is had to the following description, taken in connection with the accompanying drawings, in which.

DETAILED DESCRIPTION OF THE PREFERRED EMBODIMENTS

Figure 1:
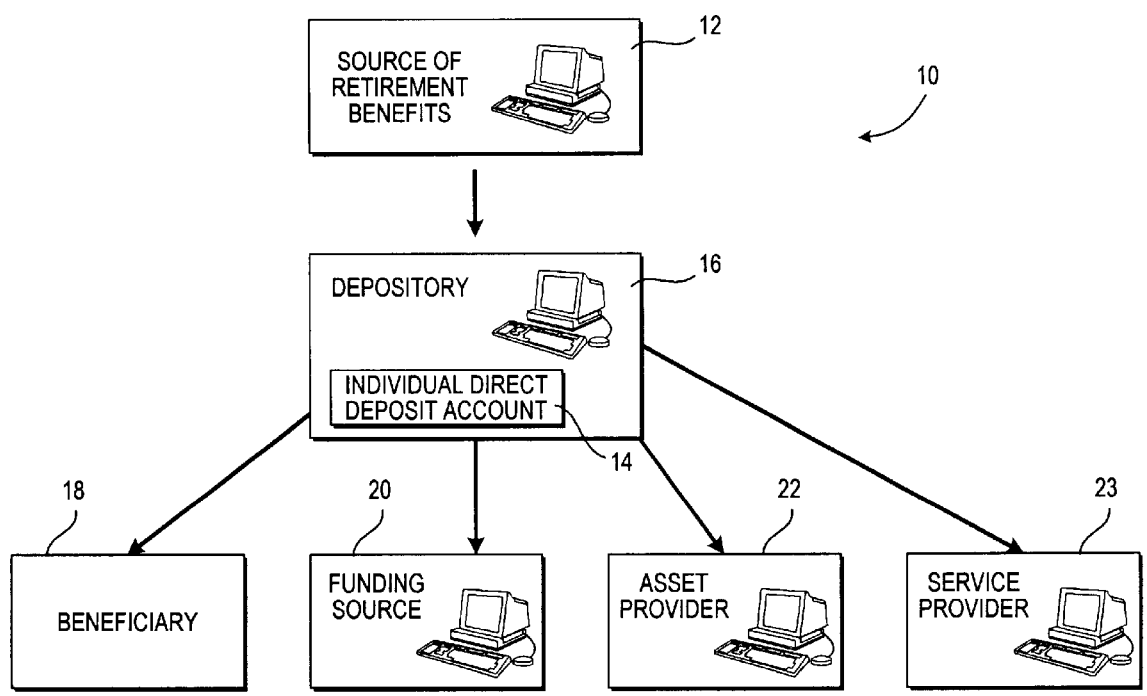
FIG. 1 depicts a system schematic of the financial program according to the present invention.

The present invention is directed to a financial program including both a system and method which enables a beneficiary of retirement income, whether Social Security payments or other retirement payments, to access a designated portion of present value of its future retirement income in the form of current capital, other type of asset, or a specified service. As described in greater detail hereinafter, the beneficiary may access current capital through a funding source (e.g., a bank, insurance company, or other investor), or acquire an asset or obtain a service (e.g., shares in a mutual fund or supplemental health insurance) directly through an asset or service provider (e.g., a life or health insurance company, a trust company, or a brokerage and securities company), in exchange for payment of a predetermined portion of the beneficiary's future retirement benefits.

Participation in the financial program according to the present invention begins when the beneficiary elects to become a party to a multi-party arrangement for a preselected period of time (e.g., five years) among the funding source, or the asset provider, or the service provider, and a financial institution designated to act as both a direct depository for a beneficiary's retirement payments and as a disbursement agent for transferring a predetermined portion of the retirement funds in the beneficiary's individual deposit account to the funding source or asset or service provider. In exchange for a lump sum payment or other form of advance from the funding source, or in exchange for the direct acquisition of an asset or service from the asset or service provider, in an amount or having a value at least in part based upon present value of a designated portion of future retirement payments (determined upon actuarial and other information and utilizing known techniques for calculating present value of a future asset), the beneficiary directs the depository to make regular disbursements to the funding source or asset or service provider over the designated term of the program of portions of retirement payments predetermined to satisfy the terms of the advance.

Preferably, amounts are disbursed to the funding source or asset or service provider as they are received, and are determined as either a specific dollar amount or as a percentage of monthly retirement payments received. The disbursed retirement payments serve as the entire consideration for the current capital or asset or service provided to the beneficiary by the funding source or asset or service provider.

At the end of the designated program term, all (100%) of the beneficiary's subsequent retirement payments are freed up for use by the beneficiary as desired. Also, the beneficiary continues to own and have the benefit of any capital or asset acquired, or service paid for, under the program. However, considering the benefits of the financial program according to the present invention, it should be appreciated that the beneficiary may choose to renew participation in the program for a new program term.

In the event that the beneficiary dies prior to the end of the program term, the funding source or asset or service provider are precluded from seeking reimbursement of any outstanding amount owed by the beneficiary from a surviving spouse's share of remaining retirement payments, or from the beneficiary's estate. Nor would the funding source or asset or service provider have any remaining interest in any asset acquired by the beneficiary under the program. Preferably, the funding source or asset or service provider will insure against the risk of loss due to the beneficiary's death, for example, by purchasing group term life insurance in its favor covering all beneficiaries participating in the program, effectively passing this benefit on to each beneficiary and its family.

The beneficiary may revoke participation in the financial program according to the present invention. It should be appreciated that requirements or restrictions may be imposed regarding the timing and manner of such revocation (e.g., revocation may be required to be made on 30 days written notice).

Also, participation in the program may otherwise be prematurely terminated upon the occurrence of certain events or by certain acts of the beneficiary, for example, if the beneficiary's retirement benefits are reduced or cut off by the beneficiary's direct or indirect actions and the beneficiary is unable or unwilling to fund the deposit account from an alternative source of capital, or if the beneficiary attempts to change the depository or disbursement arrangement, or attempts to transfer an asset acquired under the program.

In the event that the beneficiary revokes participation in the program or such participation is otherwise terminated, since the deposit account will no longer be disbursing payments to the funding source or asset or service provider, the beneficiary may become obligated to reimburse the funding source or asset or service provider in a specified amount relating to the amount of capital paid to the beneficiary, or to the value of an asset or service obtained under the program at the time it was obtained, and, when appropriate, to make up any deficiency. In satisfying the obligation to reimburse the funding source or asset provider, the beneficiary may be required to liquidate an asset acquired under the program. It should be understood that where the beneficiary has opted to receive an on-going service under the program (e.g., supplemental health insurance), that service may be terminated immediately upon the revocation or premature termination of the beneficiary's participation in the program.

Nonetheless, in the event of revocation or termination for any reason, all (100%) of future retirement payments are freed up for the beneficiary's personal use. Moreover, any value of a specific acquired asset in excess of the amount advanced by the funding source or asset or service provider remains available to the beneficiary, and any deficiency which the beneficiary is obligated to make up to the funding source or asset or service provider would be made only from resources other than future retirement payments. It should be understood that the risk of loss to the funding source or asset or service provider associated with the revocation or premature termination of a beneficiary's participation in the program may be effectively spread out over all program participants.

Referring now to the drawings, where like numerals indicate like elements, FIG. 1 depicts a simplified schematic illustration of a system, generally indicated at 10, which includes the component elements and means necessary to implement and operate the financial program according to the present invention. Desirably, and where appropriate, system 10 utilizes existing computer capabilities, both hardware and software, and electronic communications links, for example, to effect electronic funds transfers to and from the beneficiary's individual deposit account. Thus, system 10 may be arranged and constructed without a significant investment in system architecture design and software development.

System 10 includes a source of retirement benefits 12, which may be the United States Social Security Administration or a retirement plan or agreement, or similar arrangement, which are generally governed by ERISA and/or the United States tax laws. As is well known in the art, such sources of retirement benefits are funds derived from contributions of covered individuals and/or their employers or, in the case of so-called "non-qualified plans," are paid directly by the employer.

Figure 2:
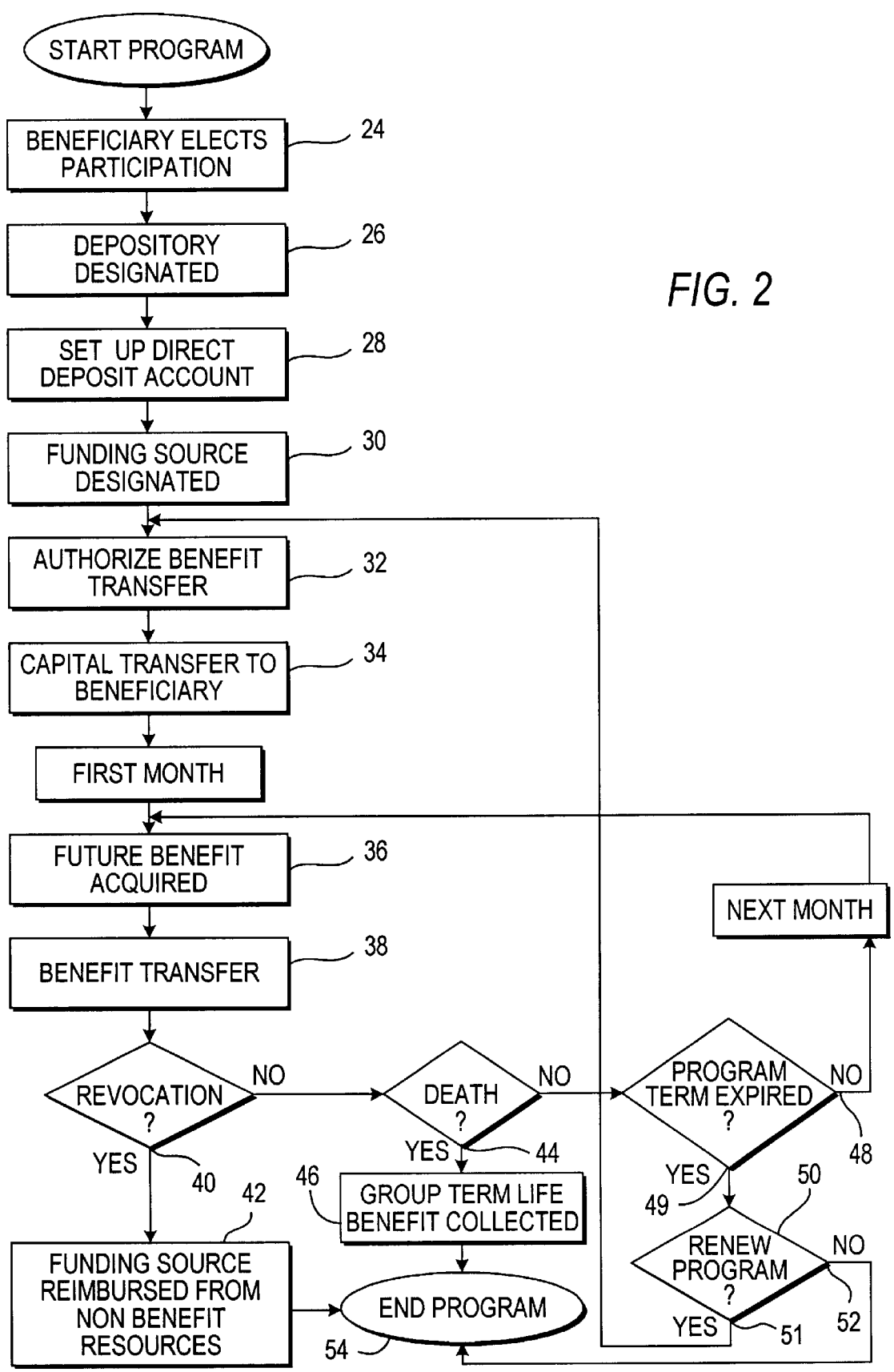
FIG. 2 is a flow chart depicting the steps performed in accessing present value of a designated portion of a beneficiary's future retirement benefits in the form of current capital in accordance with one embodiment of the financial program of the present invention.

Benefits source 12 of system 10 disburses retirement payments directly to an individual direct deposit account 14 in a designated depository 16. Preferably, this is accomplished utilizing the well-known technique of electronic funds transfer. As depicted in FIG. 1, retirement funds residing in deposit account 14 may be transferred therefrom (electronically or otherwise) to a beneficiary 18, a funding source 20, an asset provider 22, or a service provider 23 as described in greater detail hereafter in connection with the preferred methods and system according to the present invention FIG. 2 is a flow chart depicting the steps for enabling a beneficiary 18 of Social Security benefits or other retirement benefits to access present value of a designated portion of future retirement benefits in the form of current capital in accordance with one embodiment of the financial program of the present invention. After agreeing to participate in the inventive financial program for a preselected term (step 24), a financial institution is designated to act as both a direct depository 16 for the beneficiary's retirement payments and as a disbursement agent for such retirement payments (step 26). Accordingly, an individual direct deposit account 14 is set up to receive the beneficiary's future retirement benefits directly from the benefits source 12 (FIG. 1). This is illustrated in step 28.

A bank, insurance company, or other source of capital is designated to be the funding source 20 of current capital to be provided to the beneficiary 18 under the program (step 30). Since the transfer of capital from the funding source 20 to the beneficiary is to be made in exchange for the periodic payment to the funding source of a predetermined portion of the beneficiary's retirement payments, the beneficiary 18 authorizes the financial institution to permit fund transfers from the beneficiary's deposit account 14 to the funding source over the designated program term (step 32).

Capital is then paid to the beneficiary 18 from the funding source 20 in an amount at least in part based upon present value of a designated portion of the beneficiary's future retirement payments (step 34). It should be appreciated that the techniques for determining present value of a future income stream are well known to those of ordinary skill in the art.

During the first month of the beneficiary's participation in the financial program, a future retirement benefit is acquired, i.e., is deposited directly into the beneficiary's individual deposit account 14 (step 36). A predetermined portion of this benefit is then automatically disbursed to the funding source 20 (step 38).

As explained earlier, the beneficiary 18 may revoke participation in the financial program of the present invention. Also, participation in the program may otherwise be prematurely terminated, for example, if the beneficiary's retirement benefits are reduced or cut off by a direct or indirect action of the beneficiary and the beneficiary is unable or unwilling to fund the deposit account from an alternative source of capital.

If the beneficiary 18 revokes participation in the program (decision 40), or such participation is otherwise prematurely terminated, the beneficiary may become obligated to reimburse the funding source 20 for any advance, and if so only from resources other than future retirement benefits (step 42). Nonetheless, all (100%) of future retirement benefits are freed up for the beneficiary's use, and, as far as the beneficiary 18 is concerned, the program has come to an end, at least as it relates to subsequent retirement benefits (event 54). Thus, it should be understood that, in seeking reimbursement from the beneficiary 18, the funding source 20 is precluded from looking to the beneficiary's future retirement benefits.

If the beneficiary 18 should die prior to the expiration of the designated program term (event 44), there is no obligation on the part of the beneficiary's surviving spouse or the beneficiary's estate to reimburse the funding source 20 for any advance made to the beneficiary. Preferably, the funding source 20 will recover any loss due to the beneficiary's death from a group term life insurance policy in its favor covering the life of the beneficiary 18 (step 46), and indeed the lives of all beneficiaries participating in the program. The program then terminates for such beneficiary (event 54).

If the beneficiary's participation in the financial program according to the present invention has not met an untimely end (i.e., by revocation, premature termination, or death), and the designated program term has not yet run its full course (event 48), then step 36 et seq. are repeated for each month (and for each new acquisition of a future retirement benefit) remaining in the program term.

If, however, the beneficiary 18 has reached the end of the designated program term (event 49), for the continued convenience of the beneficiary, the beneficiary is preferably given the option of renewing participation in the program for a new program term (decision 50). Should the beneficiary 18 opt to renew participation in the program (decision 51), step 32 is revisited, and the program continues for a new term. Should the beneficiary 18 decline to renew participation in the program (decision 52), all (100%) of the beneficiary's subsequent retirement payments are freed up for use by the beneficiary as desired, and the program terminates for the beneficiary (event 54).

Figure 3:
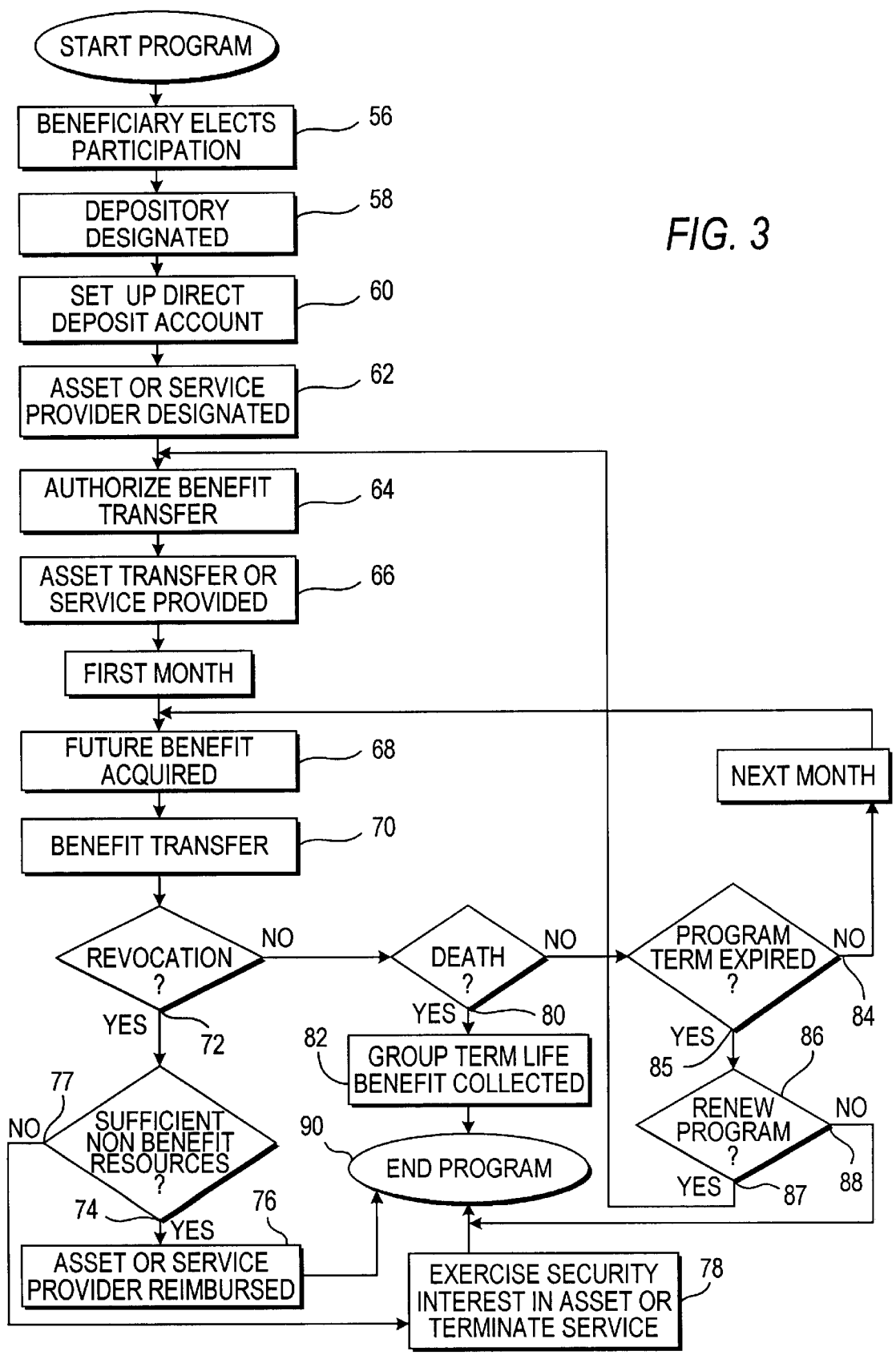
FIG. 3 is a flow chart depicting the steps performed in accessing present value of a designated portion of a beneficiary's future retirement benefits in the form of an asset or a service in accordance with another embodiment of the financial program of the present invention.

FIG. 3 is a flow chart depicting the steps for enabling a beneficiary 18 of Social Security benefits or other retirement benefits to access present value of a designated portion of its future retirement benefits in the form of an asset or service in accordance with another embodiment of the financial program of the present invention.

After agreeing to participate in the inventive financial program for a preselected term (step 56), a financial institution is designated to act as both a direct depository 16 for the beneficiary's retirement payments and as a disbursement agent for such retirement payments (step 58). Accordingly, an individual direct deposit account 14 is set up to receive the beneficiary's future retirement benefits directly from the benefits source 12 (FIG. 1). This is illustrated in step 60.

A life or health insurance company, a trust company, a brokerage and securities company, or other asset provider 22 or service provider 23 is designated to provide the beneficiary 18 with an asset or service (e.g., shares in a mutual fund or supplemental health insurance) under the program (step 62). Since the transfer of an asset or provision of a service from the asset provider 22 or service provider 23 to the beneficiary 18 is to be made in exchange for the periodic payment to the asset or service provider of a predetermined portion of the beneficiary's retirement payments, the beneficiary authorizes the financial institution to permit fund transfers from the beneficiary's deposit account to the asset or service provider over the designated program term (step 64).

The asset or service, having a value at least in part based upon present value of a designated portion of the beneficiary's future retirement payments, is then transferred to the beneficiary 18 from the asset provider 22 or service provider 23 (step 66). As noted above, it should be appreciated that the techniques for determining present value of a future income stream are well known to those of ordinary skill in the art.

During the first month of the beneficiary's participation in the financial program, a future retirement benefit is acquired, i.e., is deposited directly into the beneficiary's individual deposit account 14 (step 68). A predetermined portion of this benefit is then automatically disbursed to the asset provider 22 or service provider 23 (step 70).

As explained earlier, the beneficiary 18 may revoke participation in the financial program of the present invention. Also, participation in the program may otherwise be prematurely terminated upon the occurrence of certain events or by certain acts of the beneficiary 18, for example, if the beneficiary's retirement benefits are reduced or cut off by a direct or indirect action of the beneficiary and the beneficiary is unable or unwilling to fund the deposit account 14 from an alternative source of capital, or if the beneficiary attempts to transfer the asset acquired under the program.

If the beneficiary 18 revokes participation in the program (decision 72), or such participation is otherwise prematurely terminated, the beneficiary may become obligated to reimburse the asset provider 22 or service provider 23 in a specified amount relating to the asset or service acquired to date under the program at the time it was acquired, and, when appropriate, to make up any deficiency. However, in all circumstances, in seeking reimbursement from the beneficiary 18, the asset provider 22 or service provider 23 are precluded from looking to the beneficiary's future retirement benefits.

If the beneficiary 18 possesses resources other than future retirement benefits sufficient to reimburse the asset provider 22 or service provider 23 (event 74), the beneficiary satisfies its outstanding obligation to the asset or service provider by drawing upon such resources (step 76), and the obligations of the beneficiary under the program end (event 90). If the beneficiary 18 is unable to reimburse the asset provider 22 from resources other than future retirement benefits (event 77), the asset provider may exercise any security interest it may have in the asset acquired by the beneficiary under the program and require the beneficiary to turn over or to liquidate such asset (step 78). Furthermore, where the beneficiary 18 has chosen to receive an on-going service from the service provider 23 (e.g., supplemental health insurance), that service may be terminated immediately upon the revocation or premature termination of the beneficiary's participation in the program (step 78). It should be understood that any value of the acquired asset or service obtained in excess of the specified amount owed the asset provider 22 or service provider 23 remains available to the beneficiary 18, and any deficiency obligation would be subject to the beneficiary's obligation to reimburse the asset or service provider only from resources other than future retirement payments.

If the beneficiary 18 should die prior to the expiration of the designated program term (event 80), there is no obligation on the part of the beneficiary's surviving spouse or the beneficiary's estate to reimburse the asset provider 22 or service provider 23 for any amount owed by the beneficiary. Preferably, the asset provider 22 or service provider 23 will recover any loss due to the beneficiary's death from a group term life insurance policy in its favor covering the life of the beneficiary 18 (step 82), and indeed the lives of all beneficiaries participating in the program. The program then terminates for the beneficiary (event 90).

If the beneficiary's participation in the financial program according to the present invention has not met an untimely end (i.e., by revocation, premature termination, or death), and the designated program term has not yet run its full course (event 84), then step 68 et seq. are repeated for each month (and for each new acquisition of a future retirement benefit) remaining in the program term.

If, however, the beneficiary 18 has reached the end of the designated program term (event 85), the beneficiary is preferably given the option of renewing participation in the program for a new program term (decision 86). Should the beneficiary 18 so opt to renew participation in the program (decision 87), step 64 is revisited, and the program continues for a new term. Should the beneficiary 18 decline to renew participation in the program (decision 88), all (100%) of the beneficiary's subsequent retirement payments are freed up for use by the beneficiary as desired, and the program terminates for the beneficiary (event 90).

In accordance with the foregoing, the present invention provides a system and method for enabling beneficiaries of retirement benefits to convert future benefits into current resources to meet current financial and other needs and objectives. This is accomplished in compliance with United States laws and regulations governing the assignment of future Social Security or other retirement benefits.

It will thus be seen that the objects set forth above, among those made apparent from the preceding description, are efficiently attained and, since certain changes may be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computerized method for creating a source of funds based on present value of future retirement payments, comprising the steps of:

a. designating an account in a depository for a beneficiary to receive future retirement payments payable to said beneficiary from a source of said retirement payments for a preselected period of time;

b. designating a benefit provider for providing a monetary benefit to said beneficiary;

c. authorizing said depository to periodically disburse a predetermined portion of said retirement payments deposited in said account to said benefit provider during said preselected period of time;

d. providing said monetary benefit to said beneficiary from said benefit provider based at least in part on present value of a designated portion of said future retirement payments without encumbering said beneficiary's right to said future retirement payments and without violating legislated proscriptions in the United States against alienation of future retirement benefits;

e. causing said future retirement payments to be deposited into said account throughout said preselected period of time;

f. causing said depository to transfer a portion of said retirement payments deposited into said account to said benefit provider during said preselected period of time; and g. reimbursing said benefit provider from resources other than said future retirement payments if said transfer of a portion of said retirement payments from said depository to said benefit provider are curtailed prior to said end of said preselected period of time, and making said retirement payments available for the exclusive use of said beneficiary.

2. The method of claim 1, further comprising the steps of determining if said preselected period of time has expired, and if said preselected period of time has not expired, repeating steps e and f, and if said preselected period of time has expired, making said retirement payments available for the exclusive use of said beneficiary.

3. The method of claim 1, further comprising the steps of determining if said preselected period of time has expired, and if said preselected period of time has not expired, repeating steps e and f, and if said preselected period of time has expired, setting said preselected period of time to a new preselected period of time, repeating steps e and f, determining if said new preselected period of time has expired, and if said new preselected period of time has not expired, repeating steps e and f, and if said new preselected period of time has expired, making said retirement payments available for the exclusive use of said beneficiary.

4. The method of claim 1, further comprising the step of obtaining life insurance on the life of said beneficiary in favor of said benefit provider wherein if said beneficiary dies prior to said end of said preselected period of time, a benefit from said life insurance policy is paid to said benefit provider.

5. A computerized method for creating a source of funds based on present value of future retirement payments, comprising the steps of:

a. designating an account in a depository for a beneficiary to receive future retirement payments payable to said beneficiary from a source of said retirement payments for a preselected period of time;

b. designating a benefit provider for providing an asset other than a monetary payment to said beneficiary;

c. authorizing said depository to periodically disburse a predetermined portion of said retirement payments deposited in said account to said benefit provider during said preselected period of time;

d. providing said asset to said beneficiary from said benefit provider based at least in part on present value of a designated portion of said future retirement payments without encumbering said beneficiary's right to said future retirement payments and without violating legislated proscriptions in the United States against alienation of future retirement benefits;

e. causing said future retirement payments to be deposited into said account throughout said preselected period of time;

f. causing said depository to transfer a portion of said retirement payments deposited into said account to said benefit provider during said preselected period of time; and g. liquidating said asset and reimbursing said benefit provider from proceeds of said asset liquidation if said transfers of a portion of said retirement payments from said depository to said benefit provider are curtailed prior to said end of said preselected period of time, and making said retirement payments available for the exclusive use of said beneficiary.

6. The method of claim 5, further comprising the steps of determining if said preselected period of time has expired, and if said preselected period of time has not expired, repeating steps e and f, and if said preselected period of time has expired, making said retirement payments available for the exclusive use of said beneficiary.

7. The method of claim 5, further comprising the steps of determining if said preselected period of time has expired, and if said preselected period of time has not expired, repeating steps e and f, and if said preselected period of time has expired, setting said preselected period of time to a new preselected period of time, repeating steps e and f, determining if said new preselected period of time has expired, and if said new preselected period of time has not expired, repeating steps e and f, and if said new preselected period of time has expired, making said retirement payments available for the exclusive use of said beneficiary.

8. The method according to claim 5, further comprising the step of obtaining life insurance on the life of said beneficiary in favor of said benefit provider wherein if said beneficiary dies prior to said end of said preselected period of time, a benefit from said life insurance policy is paid to said benefit provider.

9. A computerized method for creating a source of funds based on present value of future retirement payments, comprising the steps of:

a. designating an account in a depository for a beneficiary to receive future retirement payments payable to said beneficiary from a source of said retirement payments for a preselected period of time;

b. designating a benefit provider for providing a service to said beneficiary;

c. authorizing said depository to periodically disburse a predetermined portion of said retirement payments deposited in said account to said benefit provider during said preselected period of time;

d. providing said service to said beneficiary from said benefit provider based at least in part on present value of a designated portion of said future retirement payments without encumbering said beneficiary's right to said future retirement payments and without violating legislated proscriptions in the United States against alienation of future retirement benefits;

e. causing said future retirement payments to be deposited into said account throughout said preselected period of time;

f. causing said depository to transfer a portion of said retirement payments deposited into said account to said benefit provider during said preselected period of time; and g. terminating said service if said transfers of a portion of said retirement payments from said depository to said benefit provider are curtailed prior to said end of said preselected period of time, and making said retirement payments available for the exclusive use of said beneficiary.

10. The method of claim 9, further comprising the steps of determining if said preselected period of time has expired, and if said preselected period of time has not expired, repeating steps e and f, and if said preselected period of time has expired, making said retirement payments available for the exclusive use of said beneficiary.

11. The method of claim 9, further comprising the steps of determining if said preselected period of time has expired, and if said preselected period of time has not expired, repeating steps e and f, and if said preselected period of time has expired, setting said preselected period of time to a new preselected period of time, repeating steps e and f, determining if said new preselected period of time has expired, and if said new preselected period of time has not expired, repeating steps e and f, and if said new preselected period of time has expired, making said retirement payments available for the exclusive use of said beneficiary.

12. The method according to claim 9, further comprising the step of obtaining life insurance on the life of said beneficiary in favor of said benefit provider wherein if said beneficiary dies prior to said end of said preselected period of time, a benefit from said life insurance policy is paid to said benefit provider.

13. A system for creating a source of funds based on present value of future retirement payments, comprising an account in a depository for a beneficiary to receive future retirement payments payable to said beneficiary from a source of said retirement payments for a preselected period of time, means for causing said future retirement payments to be deposited into said account during said preselected period of time, means for causing said depository to disburse a predetermined portion of said retirement payments deposited in said account to a benefit provider during said preselected period of time in exchange for a present benefit provided to said beneficiary from said benefit provider based at least in part on present value of a designated portion of said future retirement payments, said exchange being without encumbering said beneficiary's right to said future retirement payments and without violating legislated proscriptions in the United States against alienation of future retirement benefits, means for reimbursing said benefit provider from resources other than said future retirement payments if said transfers of a portion of said retirement payments from said depository to said benefit provider are curtailed prior to said end of said preselected period of time, and means for making said retirement payments available for the exclusive use of said beneficiary.

14. The system of claim 13, wherein the benefit provider is a source of capital.

15. The system of claim 13, wherein the benefit provider is a source of assets other than capital.

16. The system of claim 13, wherein the benefit provider is a provider of services.

17. The system according to claim 13, further comprising insurance on the life of said beneficiary in favor of said benefit provider wherein if said beneficiary dies prior to said end of said preselected period of time a benefit from said insurance is paid to said benefit provider.

18. A computerized method for creating a source of funds based on present value of future Social Security retirement benefits, comprising the steps of:
   a. designating an account in a depository for a beneficiary to receive future payments of Social Security retirement benefits for a preselected period of time;
   b. designating a benefit provider for providing a monetary benefit to said beneficiary;
   c. authorizing said depository to periodically disburse a predetermined portion of said Social Security payments deposited in said account to said benefit provider during said preselected period of time;
   d. providing said monetary benefit to said beneficiary from said benefit provider based at least in part on present value of a designated portion of said future payments of Social Security benefits without encumbering said beneficiary's right to said future payments of Social Security benefits and without violating legislated proscriptions in the United States against alienation of future Social Security benefits;
   e. causing said future payments of Social Security benefits to be deposited into said account throughout said preselected period of time;
   f. causing said depository to transfer a portion of said Social Security payments deposited in said account from said account to said benefit provider during said preselected period of time; and
   g. reimbursing said benefit provider from resources other than said future Social Security payments if said transfers of a portion of said Social Security payments from said depository to said benefit provider are curtailed prior to said end of said preselected period of time, and making said Social Security payments available for the exclusive use of said beneficiary.

19. The method of claim 18, further comprising the steps of determining if said preselected period of time has expired, and if said preselected period of time has not expired, repeating steps e and f, and if said preselected period of time has expired, making said Social Security payments available for the exclusive use of said beneficiary.

20. The method of claim 18, further comprising the steps of determining if said preselected period of time has expired, and if said preselected period of time has not expired, repeating steps e and f, and if said preselected period of time has expired, setting said preselected period of time to a new preselected period of time, repeating steps e and f, determining if said new preselected period of time has expired, and if said new preselected period of time has not expired, repeating steps e and f, and if said new preselected period of time has expired, making said Social Security payments available for the exclusive use of said beneficiary.

21. The method of claim 18, further comprising the step of obtaining life insurance on the life of said beneficiary in favor of said benefit provider wherein if said beneficiary dies prior to said end of said preselected period of time, a benefit from said life insurance policy is paid to said benefit provider.

22. A computerized method for creating a source of funds based on present value of future Social Security retirement benefits, comprising the steps of:
   a. designating an account in a depository for a beneficiary to receive future payments of Social Security retirement benefits for a preselected period of time;
   b. designating a benefit provider for providing an asset other than a monetary payment to said beneficiary;
   c. authorizing said depository to periodically disburse a predetermined portion of said Social Security parents deposited in said account to said benefit provider during said preselected period of time;
   d. providing said asset to said beneficiary from said benefit provider based at least in part on present value of a designated portion of said future payments of Social Security benefits without encumbering said beneficiary's right to said future payments of Social Security benefits and without violating legislated proscriptions in the United States against alienation of future Social Security benefits;

e. causing said future payments of Social Security benefits to be deposited into said account throughout said preselected period of time;

f. causing said depository to transfer a portion of said Social Security payments deposited in said account from said account to said benefit provider during said preselected period of time; and g. liquidating said asset and reimbursing said benefit provider from proceeds of said asset liquidation if said transfers of a portion of said Social Security payments from said depository to said benefit provider are curtailed prior to said end of said preselected period of time, and making said Social Security payments available for the exclusive use of said beneficiary.

23. The method of claim 22, further comprising the steps of determining if said preselected period of time has expired, and if said preselected period of time has not expired, repeating steps e and f, and if said preselected period of time has expired, making said retirement payments available for the exclusive use of said beneficiary.

24. The method of claim 22, further comprising the steps of determining if said preselected period of time has expired, and if said preselected period of time has not expired, repeating steps e and f, and if said preselected period of time has expired, setting said preselected period of time to a new preselected period of time, repeating steps e and f, determining if said new preselected period of time has expired, and if said new preselected period of time has not expired, repeating steps e and f, and if said new preselected period of time has expired, making said retirement payments available for the exclusive use of said beneficiary.

25. The method according to claim 22, further comprising the step of obtaining life insurance on the life of said beneficiary in favor of said benefit provider wherein if said beneficiary dies prior to said end of said preselected period of time, a benefit from said life insurance policy is paid to said benefit provider.

26. A computerized method for creating a source of funds based on present value of future Social Security retirement benefits, comprising the steps of:

a. designating an account in a depository for a beneficiary to receive future payments of Social Security retirement benefits for a preselected period of time;

b. designating a benefit provider for providing a service to said beneficiary;

c. authorizing aid depository to periodically disburse a predetermined portion of said Social Security parents deposited in said account to said benefit provider during said preselected period of time;

d. providing said service to said beneficiary from said benefit provider based at least in part on present value of a designated portion of said future payments of Social Security benefits without encumbering said beneficiary's right to said future payments of Social Security benefits and without violating legislated proscriptions in the United States against alienation of future Social Security benefits;

e. causing said future payments of Social Security benefits to be deposited into said account throughout said preselected period of time;

f. causing said depository to transfer a portion of said Social Security payments deposited in said account from said account to said benefit provider during said preselected period of time; and g. terminating said service if said transfers of a portion of said Social Security payments from said depository to said benefit provider are curtailed prior to said end of said preselected period of time, and making said Social Security payments available for the exclusive use of said beneficiary.

27. The method of claim 26, further comprising the steps of determining if said preselected period of time has expired, and if said preselected period of time has not expired, repeating steps e and f, and if said preselected period of time has expired, making said retirement payments available for the exclusive use of said beneficiary.

28. The method of claim 26, further comprising the steps of determining if said preselected period of time has expired, and if said preselected period of time has not expired, repeating steps e and f, and if said preselected period of time has expired, setting said preselected period of time to a new preselected period of time, repeating steps e and f, determining if said new preselected period of time has expired, and if said new preselected period of time has not expired, repeating steps e and f, and if said new preselected period of time has expired, making said retirement payments available for the exclusive use of said beneficiary.

29. The method according to claim 26, further comprising the step of obtaining life insurance on the life of said beneficiary in favor of said benefit provider wherein if said beneficiary dies prior to said end of said preselected period of time, a benefit from said life insurance policy is paid to said benefit provider.

30. A system for creating a source of funds based on present value of future Social Security retirement benefits, comprising an account in a depository for a beneficiary to receive future payments of Social Security benefits for a preselected period of time, means for causing said future payments of Social Security benefits to be deposited into said account during said preselected period of time, means for causing said depository to disburse a predetermined portion of said Social Security payments deposited in said account to a benefit provider during said preselected period of time in exchange for a present benefit provided to said beneficiary from said benefit provider based at least in part on present value of a designated portion of said future payments of Social Security benefits, said exchange being without encumbering said beneficiary's right to said future payments of Social Security benefits and without violating legislated proscriptions in the United States against alienation of future Social Security benefits, means for reimbursing said benefit provider from resources other than said future payments if said transfers of a portion of said payments from said depository to said benefit provider are curtailed prior to said end of said preselected period of time, and means for making said future payments of Social Security benefits available for the exclusive use of slid beneficiary.

31. The system of claim 30, wherein the benefit provider is a source of capital.

32. The system of claim 30, wherein the benefit provider is a source of assets other than capital.

33. The system of claim 30, wherein the benefit provider is a provider of services.

34. A The system according to claim 30, further comprising insurance on the life of said beneficiary in favor of said benefit provider wherein if said beneficiary dies prior to said end of said preselected period of time a benefit from said insurance is paid to said benefit provider.

* * * * *